US010227913B2

(12) United States Patent
Skopil

(10) Patent No.: US 10,227,913 B2
(45) Date of Patent: Mar. 12, 2019

(54) METHOD AND DEVICE FOR ADJUSTING A CHARGING PRESSURE IN AN INTERNAL COMBUSTION ENGINE BY MEANS OF A PRESSURE-WAVE SUPERCHARGER

(71) Applicant: Antrova AG, Stein am Rhein (CH)

(72) Inventor: Mario Skopil, Birmensdorf (CH)

(73) Assignee: Antrova AG, Stein am Rhein (CH)

( * ) Notice: Subject to any disclaimer, the term of this patent is extended or adjusted under 35 U.S.C. 154(b) by 0 days.

(21) Appl. No.: 15/518,359

(22) PCT Filed: Oct. 13, 2015

(86) PCT No.: PCT/EP2015/073644
§ 371 (c)(1),
(2) Date: Apr. 11, 2017

(87) PCT Pub. No.: WO2016/059034
PCT Pub. Date: Apr. 21, 2016

(65) Prior Publication Data
US 2017/0298809 A1 Oct. 19, 2017

(30) Foreign Application Priority Data
Oct. 13, 2014 (EP) .................................... 14188661

(51) Int. Cl.
*F02B 33/42* (2006.01)
*F02D 41/18* (2006.01)
(Continued)

(52) U.S. Cl.
CPC .............. *F02B 33/42* (2013.01); *F02B 39/10* (2013.01); *F02D 41/0007* (2013.01);
(Continued)

(58) Field of Classification Search
CPC ...... F02B 33/42; F02B 39/10; F02D 41/0007; F02D 41/18; Y02T 10/144
See application file for complete search history.

(56) References Cited

U.S. PATENT DOCUMENTS

| 4,662,342 | A | 5/1987 | Altmann et al. |
| 4,910,959 | A | 3/1990 | Dones |
| (Continued) | | | |

FOREIGN PATENT DOCUMENTS

| DE | 102006020522 A1 | 11/2007 |
| EP | 2562381 A1 | 2/2013 |
| (Continued) | | |

OTHER PUBLICATIONS

International Search Report (in English and German) and Written Opinion of the ISA for PCT/EP2015/073644, ISA/EP, dated Apr. 4, 2016.

*Primary Examiner* — Kevin A Lathers
(74) *Attorney, Agent, or Firm* — Harness, Dickey & Pierce, P.L.C.

(57) ABSTRACT

The invention relates to a method and to a device for adjusting a charging pressure in an internal combustion engine by means of a pressure-wave supercharger, wherein the pressure-wave supercharger has a cell rotor, which passes through at least two compression cycles per revolution, wherein a high-pressure exhaust-gas flow is divided into a first and a second high-pressure exhaust-gas partial flow, wherein a fresh-air flow and the first high-pressure exhaust-gas partial flow are fed to the cell rotor and a first compressed fresh-air flow and a low-pressure exhaust-gas flow are led away from the cell rotor in the first compression cycle, and wherein the fresh-air flow and the second high-pressure exhaust-gas partial flow are fed to the cell rotor and a second compressed fresh-air flow and the low-pressure exhaust-gas flow are led away from the cell rotor in the
(Continued)

second compression cycle, wherein the first and the second compressed fresh-air flow are combined into a charge air, and wherein the charge air is fed to the internal combustion engine, wherein the second high-pressure exhaust-gas partial flow is controlled in order to control the charging pressure of the charge air in such a way, and wherein the second compressed fresh-air flow is led through a check valve before the first and the second compressed fresh-air flow are combined into the charge air.

11 Claims, 4 Drawing Sheets

(51) Int. Cl.
  *F02D 41/00* (2006.01)
  *F02B 39/10* (2006.01)
  *F02D 23/00* (2006.01)
  *F04F 13/00* (2009.01)

(52) U.S. Cl.
  CPC .............. *F02D 41/18* (2013.01); *F02D 23/00* (2013.01); *F02D 2200/0406* (2013.01); *F04F 13/00* (2013.01); *Y02T 10/144* (2013.01)

(56) References Cited

U.S. PATENT DOCUMENTS

| | | | |
|---|---|---|---|
| 6,988,493 B2 * | 1/2006 | Wenger | F02B 33/42 123/559.2 |
| 7,669,587 B2 * | 3/2010 | Guzzella | F01N 3/101 123/559.2 |
| 2013/0037008 A1 | 2/2013 | Takamiya | |
| 2013/0206116 A1 * | 8/2013 | Legrom | F02B 33/42 123/559.1 |

FOREIGN PATENT DOCUMENTS

| | | |
|---|---|---|
| FR | 2890688 A3 | 3/2007 |
| WO | WO-2011100958 A1 | 8/2011 |

\* cited by examiner

METHOD AND DEVICE FOR ADJUSTING A CHARGING PRESSURE IN AN INTERNAL COMBUSTION ENGINE BY MEANS OF A PRESSURE-WAVE SUPERCHARGER

CROSS-REFERENCE TO RELATED APPLICATIONS

This application is a 371 U.S. National Stage of International Application No. PCT/EP2015/073644, filed Oct. 13, 2015, which claims priority to European Patent Application No. 14188661.4, filed Oct. 13, 2014. The entire disclosures of the above applications are incorporated herein by reference.

The invention relates to a method for adjusting a charging pressure in an internal combustion engine having a pressure-wave supercharger in accordance with the preamble of claim 1. The invention furthermore relates to a device for adjusting a charging pressure in an internal combustion engine having a pressure-wave supercharger in accordance with the preamble of claim 11.

PRIOR ART

There is a known practice of increasing the power or efficiency of an internal combustion engine by using a pressure-wave supercharger. The pressure-wave supercharger compresses the fresh air drawn in and thereby increases the charging pressure of the internal combustion engine. Beginning with a cold start, the internal combustion engine of a motor vehicle is operated in various states during the subsequent operating phase. For efficient operation, it is therefore also necessary to adapt the pressure-wave supercharger to the respective actual operating state of the internal combustion engine.

Document DE 10 2006 020 522 A1 discloses a method for operating an internal combustion engine in which fresh air is compressed by a pressure-wave supercharger. The disadvantage with this pressure-wave supercharger is the fact that a housing offset is required in order to control it. Document WO2011/100958A1 discloses another method for adjusting a charging pressure of an internal combustion engine with the aid of a pressure-wave supercharger. The disadvantage with this pressure-wave supercharger is the fact that an adjustable gate in the air housing is required for the control of said supercharger. Both methods have the disadvantage that they cannot be performed efficiently in the case of a cold start and at a low engine load or at a low volume flow since only a pressure which is too low can be produced. Moreover, the two known pressure-wave superchargers have the disadvantage that, by virtue of their design, a relatively large gap is required between the rotating and the fixed components, which additionally reduces efficiency.

DESCRIPTION OF THE INVENTION

It is the object of the invention to form a method and a device for adjusting a charging pressure in an internal combustion engine having a pressure-wave supercharger which are more advantageous in terms of emissions behavior, response and efficiency. In particular, it should be possible for the method according to the invention or the device according to the invention to build up a pressure even at low volume flows, and they should furthermore have a higher efficiency.

In particular, this object is achieved by means of a method for adjusting a charging pressure in an internal combustion engine having a pressure-wave supercharger, wherein the pressure-wave supercharger has a cell rotor, which passes through at least two compression cycles per revolution, wherein a high-pressure exhaust-gas flow is divided into a first and a second high-pressure exhaust-gas partial flow, wherein a fresh-air flow and the first high-pressure exhaust-gas partial flow are fed to the cell rotor and a first compressed fresh-air flow and a low-pressure exhaust-gas flow are led away from the cell rotor in the first compression cycle, and wherein the fresh-air flow and the second high-pressure exhaust-gas partial flow are fed to the cell rotor and a second compressed fresh-air flow and the low-pressure exhaust-gas flow are led away from the cell rotor in the second compression cycle, wherein the first and the second compressed fresh-air flow are combined into a charging air, and wherein the charging air is fed to the internal combustion engine, and wherein the quantities of the first and of the second high-pressure exhaust-gas partial flow are controlled independently of one another, and the pressure or, optionally, the quantity of the charging air is controlled in this way. It is preferable if the first high-pressure exhaust-gas partial flow is fed in an uncontrolled manner to the cell rotor, and if the second high-pressure exhaust-gas partial flow is fed in a controlled manner to the cell rotor in order in this way to control the charging pressure of the charging air, wherein the second compressed fresh-air flow is led through a check valve before the first and the second compressed fresh-air flow are combined into the charging air.

In particular, the object is furthermore achieved by means of a device for adjusting a charging pressure in an internal combustion engine having a pressure-wave supercharger, wherein the pressure-wave supercharger has a cell rotor, an intake-air duct, a charging-air duct, a high-pressure exhaust-gas duct and an outlet duct, wherein the intake-air duct, the high-pressure exhaust-gas duct and the charging-air duct are arranged in such a way that a fresh-air flow can be fed to the cell rotor via the intake-air duct and a high-pressure exhaust-gas flow can be fed to the cell rotor via the high-pressure exhaust-gas duct, and that a compressed fresh air can be discharged from the cell rotor via the charging-air duct, wherein the pressure-wave supercharger is designed in such a way that it performs at least one first and one second compression cycle during one revolution inasmuch as the intake-air duct branches into a first and a second intake-air subduct, inasmuch as the high-pressure exhaust-gas duct branches into a first and a second high-pressure exhaust-gas subduct, and inasmuch as the charging-air duct is supplied by a first and a second charging-air subduct, wherein a controllable valve is arranged in the second high-pressure exhaust-gas subduct in order to control the quantity of the high-pressure exhaust-gas flow flowing through the second high-pressure exhaust-gas subduct, wherein a check valve is arranged in the second air-guiding duct, and wherein an open-loop and closed-loop control device is provided, which actuates the controllable valve in accordance with a load input, in particular of a gas pedal, in order thereby to control the quantity of the charging air fed to the internal combustion engine.

In the method according to the invention, the pressure-wave supercharger comprises at least two compression cycles, wherein a valve, designed as a control slide for example, by means of which the high-pressure exhaust-gas flow can be opened or closed, or by means of which the gas quantity flowing through or the pressure of the high-pressure exhaust-gas flow can be regulated, is arranged in at least one of the compression cycles. The position of the control slide determines the build-up surface acting on the second high-pressure exhaust-gas partial flow 4e or the flow rate through the control slide, with the result that the position of the control slide determines the pressure acting on the second compressed fresh-air flow. Regulating the high-pressure exhaust-gas flow has the effect that the pressure or the charging-air quantity output by the pressure-wave supercharger can be regulated. This method has the advantage that the second compression cycle remains completely shut down at a low engine load or a low volume flow of the exhaust gas, since the valve remains completely closed during the second compression cycle. Shutting down one high-pressure exhaust-gas flow means that there are fewer gas-carrying ducts in the pressure-wave supercharger, resulting in the advantage that an appropriate pressure of the charging air can be produced, even at a low volume flow. Shutting down one compression cycle has the effect that the high-pressure exhaust-gas flow of the device according to the invention is operated with only half the build-up surface in this operating state, with the result that the free cross section is only half as large, as compared with operation without cycle shutdown, and therefore it is possible to build up or produce a sufficiently high pressure in order thereby to produce a charging air of appropriate pressure, even at low volume flows. The method according to the invention has the advantage that the pressure-wave supercharger has a significantly better response in the case of a cold start, i.e. the pressure-wave supercharger can build up a suitable charging pressure relatively quickly during the cold start in order to supply the internal combustion engine with a pressurized charging air or to operate the internal combustion engine at a higher power. In another advantageous embodiment, the method has the advantage that the pressure-wave supercharger can be operated with a single compression cycle up to about half of its total capacity, and that the pressure-wave supercharger is operated with two compression cycles at above half the total capacity, and that the speed of the pressure-wave supercharger advantageously has to be varied only slightly when the second compression cycle is switched on. Thus, the pressure-wave supercharger runs largely in the upper speed range, resulting in the advantage that adjustable gates or control edges of the kind known, for example, from the prior art from document EP 2562381A1, are no longer required.

The method according to the invention is advantageously performed in such a way that the pressure-wave supercharger is operated in a first operating state, in which a first high-pressure exhaust-gas partial flow is fed to the cell rotor during the first compression cycle and no second high-pressure exhaust-gas partial flow is fed to the cell rotor during the second compression cycle, that the pressure-wave supercharger is operated in a second operating state, in which it is the case both that the first high-pressure exhaust-gas partial flow is fed to the cell rotor during the first compression cycle and that the second high-pressure exhaust-gas partial flow is fed to the cell rotor during the second compression cycle, and that a switch is made between the first and the second operating state, depending on a measured operating state value and a predetermined setpoint switchover value. As a state variable during the operation of the pressure-wave supercharger, the quantity of charging air fed to the internal combustion engine or the pressure of the charging air or the engine speed, in particular, is suitable as a measured operating state value. A value in a range between 40% and 50% of a maximum possible operating state value is suitable as a setpoint switchover value, in particular.

The method according to the invention has the advantage that the high-pressure exhaust-gas flow coming out of the internal combustion engine can be used in a particularly advantageous manner in order to produce a charging-air pressure matched to the respective power range of the engine, or to supply the internal combustion engine with a variable quantity of charging air matched to the respective power range of the engine. In particular, the quantity of charging air supplied is determined for the position of the charging-air throttle valve.

In another advantageous embodiment, the method according to the invention is performed in such a way that the second high-pressure exhaust-gas partial flow or the second main high-pressure exhaust-gas partial flow is not completely interrupted during the second compression cycle in the first operating state. This further advantageous method is therefore performed in such a way that the pressure-wave supercharger is operated in a first operating state, in which the first high-pressure exhaust-gas partial flow is fed to the cell rotor during the first compression cycle, and the second high-pressure exhaust-gas partial flow or the second main high-pressure exhaust-gas partial flow is reduced by a valve during the second compression cycle and, as a result, a second, reduced high-pressure exhaust-gas partial flow is supplied, in such a way that the pressure-wave supercharger is operated in a second operating state, in which it is the case both that the first high-pressure exhaust-gas partial flow is fed to the cell rotor during the first compression cycle and that the unreduced, second high-pressure exhaust-gas partial flow is fed to the cell rotor during the second compression cycle, and in such a way that a switch is made between the first and the second operating state, depending on a measured operating state value and a predetermined setpoint switchover value.

The method according to the invention or the device according to the invention requires a pressure-wave supercharger having at least two compression cycles, wherein it is also possible for more than two compression cycles to be provided, wherein at least one of the compression cycles has a controllable valve, by means of which the high-pressure exhaust-gas flow of the corresponding compression cycle can be controlled and shut down in order thereby to control the pressure or the quantity of the fresh-air flow and thereby control the quantity and pressure of the charging air.

In an advantageous embodiment, the valve is capable both of regulating the high-pressure exhaust-gas partial flow fed to the cell rotor of the pressure-wave supercharger and of regulating the exhaust-gas quantity fed to the variable gas pocket. In a particularly advantageous embodiment, the valve is designed as a control slide.

The invention is described below in detail by means of examples.

BRIEF DESCRIPTION OF THE DRAWINGS

In the drawings used to explain the illustrative embodiments.

In the drawings, identical parts are provided with identical reference signs in all cases.

EMBODIMENTS OF THE INVENTION

Figure 1:
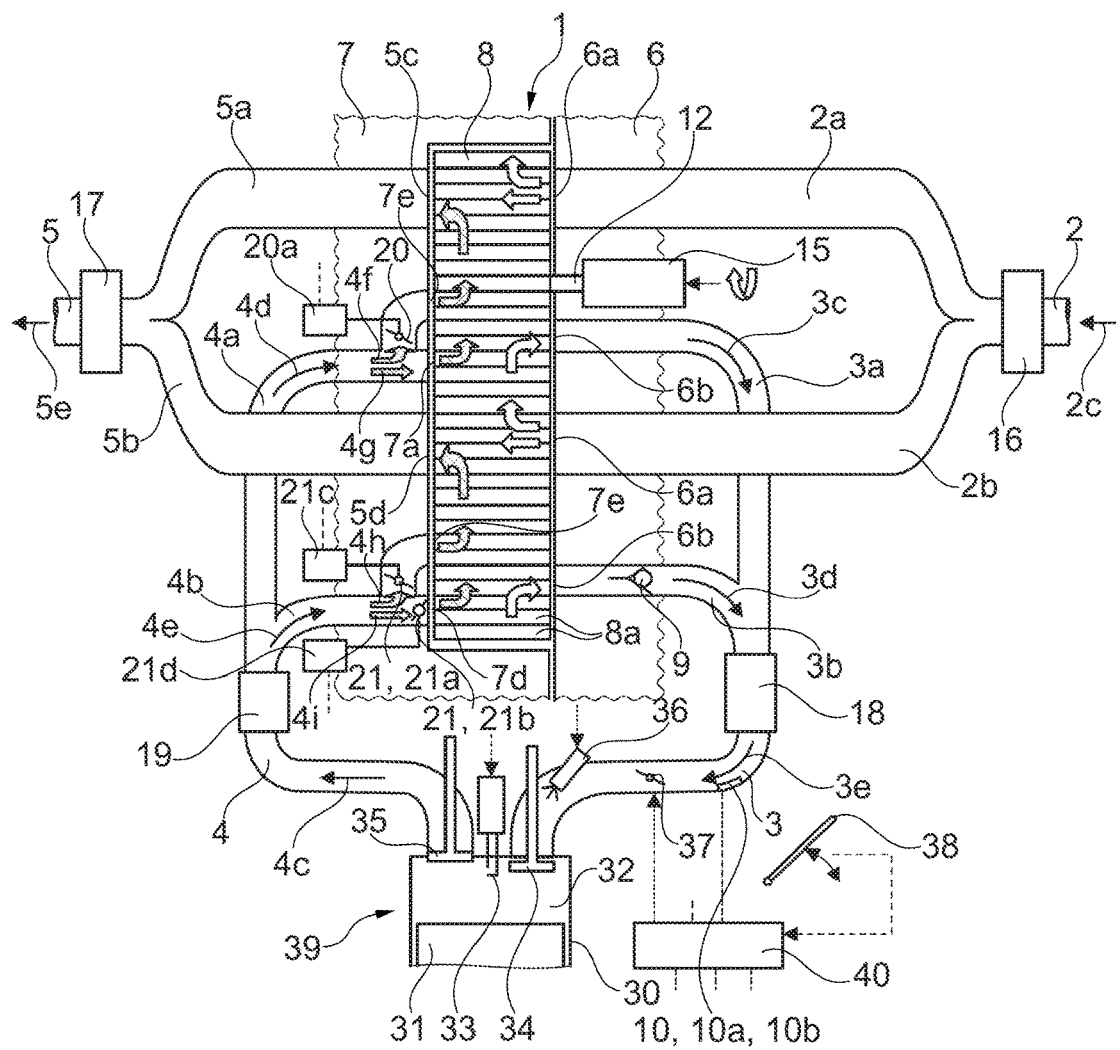
FIG. 1 shows a schematic illustration of an internal combustion engine by means of a pressure-wave supercharger.

FIG. 1 shows a device for adjusting a charging pressure in an internal combustion engine 39. The internal combustion engine 39 comprises a plurality of cylinders 30, of which only a single one is illustrated in FIG. 1. Arranged in the cylinder 30 is a piston 31. The cylinder 30 has an inlet valve 34, an outlet valve 35 and a spark plug 33. A charging air 3e is fed to the cylinder 30 via a charging-air duct 3, wherein a fuel is furthermore mixed in with the charging air 3e by means of an injection valve 36. The combustion exhaust gases emerging from the cylinder 30 are discharged as a high-pressure exhaust-gas flow 4c via an exhaust-gas duct 4. By means of at least one sensor 10, e.g. a pressure sensor 10a for measuring the pressure of the charging air 3e, or by means of a sensor 10b for measuring the quantity of charging air 3e, e.g. a heated wire sensor, the open-loop and closed-loop control device 40 can measure an operating state B of the internal combustion engine 39 or of the pressure-wave supercharger 1 or can calculate an operating state B from the measured values.

FIG. 1 furthermore shows a pressure-wave supercharger comprising an air housing 6, a gas housing 7, a rotatably mounted cell rotor 8 arranged therein, and a plurality of feed lines, discharge lines and drives. FIG. 1 shows a development of a section through the cylinder over 360° of the cell rotor 8 and the corresponding feed lines, discharge lines and drives, wherein the pressure-wave supercharger 1 or the cell rotor 8 is designed for two compression cycles per revolution.

A fresh-air flow 2c is passed through an air filter 16 via an intake-air duct 2 and then divided into two partial flows and fed to the cell rotor 8 via a first intake-air subduct 2a and a second intake-air subduct 2b via a fresh-air inlet 6a. A low-pressure exhaust gas flows out of the cell rotor 8 via an exhaust-gas outlet 5c and an exhaust-gas outlet 5d, then flows through an oxidation catalyst 17 and an outlet duct 5 and is then discharged to the environment as a low-pressure exhaust-gas flow 5e. The high-pressure exhaust-gas flow 4c is fed via the exhaust-gas duct 4 to a three-way catalyst 19, and is then divided into a first high-pressure exhaust-gas partial flow 4d and a second high-pressure exhaust-gas partial flow 4e by means of a first high pressure exhaust-gas subduct 4a and a second high pressure exhaust-gas subduct 4b. The first high-pressure exhaust-gas partial flow 4d is divided into a first main high-pressure exhaust-gas partial flow 4g and a first gas-pocket flow 4f. The first main high-pressure exhaust-gas partial flow 4g is fed to the cell rotor 8 via an exhaust-gas inlet 7a, and the first gas-pocket flow 4f is fed to a gas pocket 7e. There is no valve provided in the direction of the cell rotor 8 in the first main high-pressure exhaust-gas partial flow 4g, and therefore the first main high-pressure exhaust-gas partial flow 4g is fed to the cell rotor 8 in an uncontrolled manner. The proportion of the first high-pressure exhaust-gas partial flow 4d which is fed as a first gas-pocket flow 4f to the gas pocket 7e can be controlled by means of a first gas-pocket valve 20 comprising a gas-pocket valve drive 20a. In an advantageous method, e.g. after a cold start of an engine, the gas-pocket valve 20 remains closed during a warm-up phase, for example, and therefore the main high-pressure exhaust-gas partial flow 4g corresponds to the first high-pressure exhaust-gas partial flow 4d.

The second high-pressure exhaust-gas partial flow 4b is divided into a second main high-pressure exhaust-gas partial flow 4i and a second gas-pocket flow 4h. The second main high-pressure exhaust-gas partial flow 4i is fed via a controllable main-gas flow valve 21b to an exhaust-gas inlet 7d and then to the cell rotor 8. The second gas-pocket flow 4h is fed to a gas pocket 7e. The division of the first high pressure exhaust-gas partial flow 4d into the second gas-pocket flow 4h and the second main high-pressure exhaust-gas partial flow 4i can be controlled by means of a second gas-pocket valve 21a comprising a gas-pocket valve drive 21c and by means of the main-gas flow valve 21b with drive 21d. The main-gas flow valve 21b and the second gas-pocket valve 21a can be coupled to one another, or they can also be controlled independently of one another and can thus also assume different positions and, in particular, can also be completely open or completely closed. The gas-pocket valve 21a and the main-gas flow valve 21b can also be designed as a single valve 21, which forms both the gas-pocket valve and the main-gas flow valve. In an advantageous method, e.g. after a cold start of an engine, the gas-pocket valve 21a remains closed during a warm-up phase, for example, with the result that the second main high-pressure exhaust-gas flow 4i corresponds to the second high pressure exhaust-gas partial flow 4e.

The fresh-air flow 2c flowing into the cell rotor 8 via the fresh-air inlets 6a is compressed in the cell rotor 8 and is fed as a first and a second compressed fresh-air flow 3c, 3d to a charging-air cooler 18 via the charging-air outlets 6b with the aid of a first charging-air subduct 3a and a second charging-air subduct 3b, respectively, in order then to be fed to the cylinder 30 as charging air 3e. Arranged in the second charging-air subduct 3b is a check valve 9. The check valve 9 is necessary to avoid charging air 3e flowing back into the cell rotor 8, especially when the valve 21 or 21b is completely closed.

The pressure-wave supercharger 1 furthermore comprises an open-loop and closed-loop device 40, which is connected by signal lines to a load input 38, preferably designed as a gas pedal, and to a charging-air throttle valve 37, an electric motor 15 and drives 20a, 21c, 21d. The electric motor 15 is connected by a rotor shaft 12 to the cell rotor 8 in order to drive the latter. In another embodiment, the drive of the rotor 8 can be accomplished by the internal combustion engine 39 via a suitable transmission, instead of by the electric motor 15.

The method for adjusting the charging pressure in the internal combustion engine 39 having the pressure-wave supercharger 1 is performed in such a way that the cell rotor 8 passes through two compression cycles per revolution, wherein the high-pressure exhaust-gas flow 4c is divided into the first and the second high-pressure exhaust-gas partial flow 4d, 4e, wherein the fresh-air flow 2c and the first high-pressure exhaust-gas partial flow 4d are fed to the cell rotor 8 and the first compressed fresh-air flow 3c and the low-pressure exhaust-gas flow 5e are led away from the cell rotor 8 in the first compression cycle, and wherein the fresh-air flow 2c and the second high-pressure exhaust-gas partial flow 4e are fed to the cell rotor 8 and the second compressed fresh-air flow 3d and the low-pressure exhaust-gas flow 5e are led away from the cell rotor 8 in the second compression cycle, wherein the first and the second compressed fresh-air flow 3c, 3d are combined into a charging air 3e, and wherein the charging air 3e is fed to the internal combustion engine 39. The quantity of the first and of the second high-pressure exhaust-gas partial flow 4d, 4e are controlled independently of one another in order thereby to produce the required pressure of the charging air 3e. The first high-pressure exhaust-gas partial flow 4d is preferably fed in an uncontrolled manner to the cell rotor 8, and the second high-pressure exhaust-gas partial flow 4e is fed to the cell rotor 8 in a manner controlled by the valve 21, 21b in order in this way to control the charging pressure of the charging air. The two valves 20 and 21 can preferably be controlled independently of one another, wherein these valves 20 and 21 are preferably mechanically separated, thus allowing them to be moved independently of one another.

Figure 2:
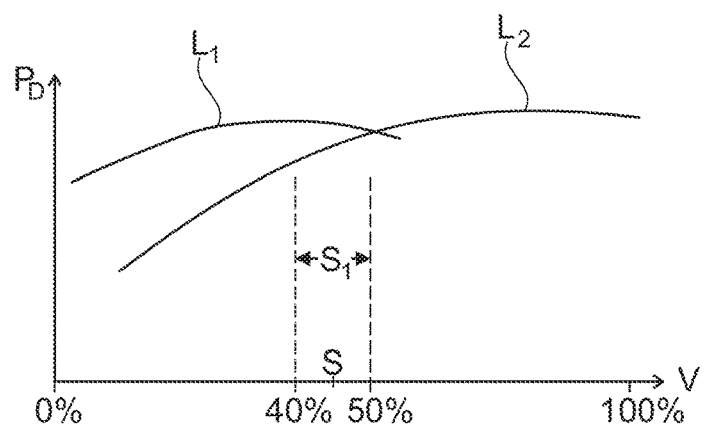
FIG. 2 shows an illustration of the pressure of the charging air produced by the pressure-wave supercharger as a function of the volume flow.

FIG. 2 shows the volume flow V of the charging air 3e or the charging-air quantity as a function of a pressure ratio $P_D$ of the charging air 3e. Quantity is taken to mean the mass flow, that is to say, in the case of the charging-air quantity, the mass flow of charging air in kilograms per second. The volume flow V is given in % of a maximum volume flow, which is the maximum possible in a particular combination of an internal combustion engine 39 and a pressure-wave supercharger 1. The pressure ratio $P_D$ is the quotient of the charging-air pressure P of the charging air 3e and the ambient pressure. In a lower power range or a first operating state L1, the internal combustion engine 39 requires only a limited quantity of charging air 3e. A maximum charging-air quantity $L_{Max}$ can be fed to the internal combustion engine 39. Where the charging-air quantity 3e currently being supplied is less than about 40% to 50% of the maximum charging-air quantity $L_{Max}$, the first high-pressure exhaust-gas partial flow 4d is fed to the cell rotor 8 during the first compression cycle, whereas no second high-pressure exhaust-gas partial flow 4e is supplied during the second compression cycle since the main-gas flow valve 21b and the second gas-pocket valve 21a are completely closed. As soon as the internal combustion engine 39 is operated in an upper power range or a second operating state L2, it requires a larger quantity of charging air 3e. In this operating state, the pressure-wave supercharger is operated in accordance with curve L2, and it is the case both that the first high-pressure exhaust-gas partial flow 4d is fed to the cell rotor 8 during the first compression cycle and that the second high-pressure exhaust-gas partial flow 4e is fed to the cell rotor 8 during the second compression cycle since the main-gas flow valve 21b and, if required, also the second gas-pocket valve 21a are at least partially open during the second compression cycle.

In the lower power range or in the first operating state L1, the pressure-wave supercharger 1 could also be operated in such a way that it is the case both that the first-pressure exhaust-gas partial flow 4d is supplied during the first compression cycle and that the second high-pressure exhaust-gas partial flow 4e is supplied during the second compression cycle, since both high-pressure exhaust-gas partial flows 4d, 4e can be controlled by means of a separately controllable main-gas flow valve and, if need be, additionally by means of a gas-pocket valve.

In a preferred method, the pressure-wave supercharger 1 is operated in a first operating state L1, in which the first high-pressure exhaust-gas partial flow 4d is fed to the cell rotor 8 during the first compression cycle and no second high-pressure exhaust-gas partial flow 4e is fed to the cell rotor 8 during the second compression cycle, and the pressure-wave supercharger 1 is operated in a second operating state L2, in which it is the case both that the first high-pressure exhaust-gas partial flow 4d is fed to the cell rotor 8 during the first compression cycle and that the second high-pressure exhaust-gas partial flow 4e is fed to the cell rotor 8 during the second compression cycle, and a switch is made between the first and the second operating state L1, L2, depending on the measured operating state value B and a predetermined setpoint switchover value S.

The value of the supplied quantity of charging air 3e or of the charging air pressure P of the charging air 3e or the engine speed U of the internal combustion engine is preferably used as the operating state value B. A reference value corresponding to the operating state value is preferably input as the setpoint switchover value S. The setpoint switchover value S is chosen in such a way, for example, that a maximum charging-air quantity $L_{Max}$ can be fed to the internal combustion engine 39 and that the setpoint switchover value S is a value in a range S1 from 40% to 50% of the maximum charging-air quantity $L_{Max}$. The setpoint switchover value S can also be chosen in such a way, for example, that the charging air 3e fed to the internal combustion engine 39 can have a maximum charging-air pressure $P_{Max}$ and that the setpoint switchover value S is a value in a range of from 40% to 50% of the maximum charging-air pressure $P_{Max}$, e.g. 40% or 45% or 50%.

If the charging-air quantity 3e currently being supplied is more than a predetermined setpoint switchover value S, preferably 40% to 50% of the maximum charging-air quantity $L_{Max}$, then both the first high-pressure exhaust-gas partial flow 4d is fed to the cell rotor 8 during the first compression cycle in the second operating state L2 and the second high-pressure exhaust-gas partial flow 4e is fed to the cell rotor 8 during the second compression cycle since the main-gas flow valve 21b and optionally also the second gas-pocket valve 21a are open. As illustrated in FIG. 2, the switchover between the two operating states L1, L2 preferably takes place within a range S1, wherein the range S1 has a width of 10% in the illustrative embodiment shown. For the switchover between the two operating modes, a setpoint switchover value S is advantageously specified, e.g. 40% or 45% or 50%, and when this is exceeded, starting from low values, a switch is made to operating mode L2, in which the first and the second high-pressure exhaust-gas partial flow 4d, 4e are supplied both during the first compression cycle and during the second compression cycle, while, when it is undershot, starting from high values, a switch is made to operating mode L1, in which the first high-pressure exhaust-gas partial flow 4d is supplied only during the first compression cycle.

As can be seen from FIG. 2, the method according to the invention has the advantage that the pressure of the charging air 3e in the region of curve L1, that is to say also at a relatively low volume flow, can be kept at a relatively high value.

The pressure-wave supercharger 1 illustrated in FIG. 1 can also be designed in such a way that it comprises more than two compression cycles, e.g. 3, 4, 5 or 6 compression cycles, wherein it must be possible to control at least one high-pressure exhaust-gas partial flow 4e independently of the other high-pressure exhaust-gas partial flows 4d in order to achieve the effect described in FIGS. 1 and 2.

Figure 3:
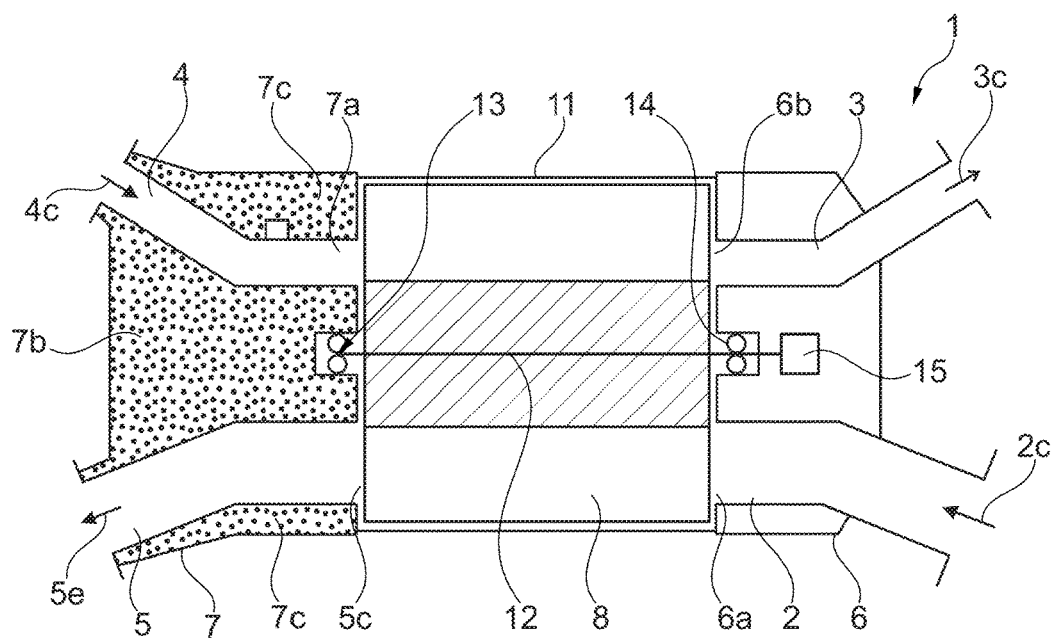
FIG. 3 shows, schematically, a longitudinal section through a pressure-wave supercharger.

FIG. 3 shows a pressure-wave supercharger 1 of particularly advantageous design in a longitudinal section, comprising an air housing 6, a cell rotor 8 with a rotor housing 11 surrounding the latter, and a gas housing 7. The cell rotor 8 is supported on both sides via a rotor shaft 12 in respective bearings 13, and is driven by an electric motor 15 or via a transmission. The fresh-air flow 2c is supplied via the intake-air duct 2, compressed in the cell rotor 8 and discharged again via the charging-air duct 3 as compressed fresh-air flow 3c. The high-pressure exhaust-gas flow 4c is fed to the cell rotor 8 via the exhaust-gas duct 4 and is discharged again via the outlet duct 5 as low-pressure exhaust-gas flow 5e. The gas housing 7 comprises a water cooling system 7b, 7c, which provides the advantage that the temperatures of the gas housing 7 are reduced. This makes it possible to install a reliably functioning valve 21 in the gas housing 7, despite the high temperatures of the high-pressure exhaust-gas flow 4c.

Figure 4:
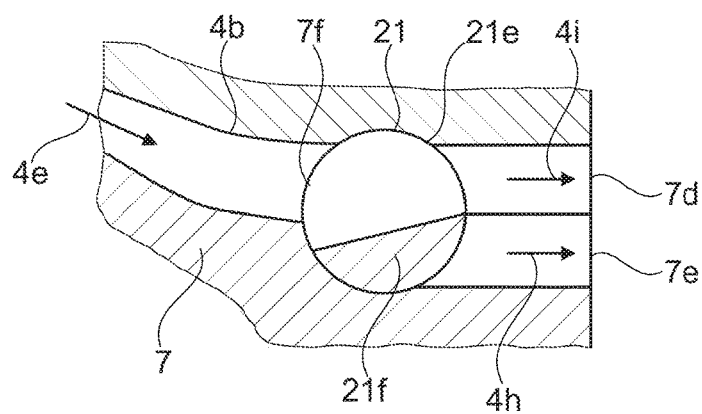
FIG. 4 shows a section through one illustrative embodiment of a rotary slide.

FIG. 4 shows, schematically, a valve 21 arranged in the gas housing 7. The second high-pressure exhaust-gas partial flow 4e is fed to the valve 21 via a second high-pressure exhaust-gas subduct 4b and is fed to the cell rotor 8 by the exhaust-gas inlet 7d as the second main high-pressure exhaust-gas partial flow 4i. Depending on the position of the valve 21, a second gas-pocket flow 4h is furthermore fed to a gas pocket 7e. In an advantageous embodiment, the valve 21 comprises a sleeve 21e, in which a rotary slide 21f is rotatably mounted. The sleeve 21e is preferably composed of steel and is advantageously arranged in the gas housing 7.

Figure 5:
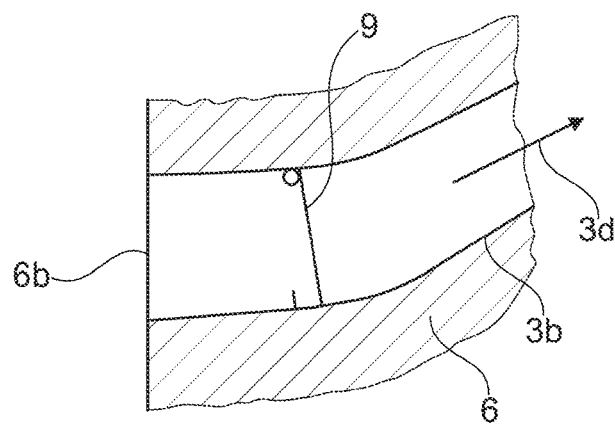
FIG. 5 shows a section through one illustrative embodiment of a check valve.

FIG. 5 shows, by way of example, a check valve 9, which is arranged in the air housing 6 in the second charging-air subduct 3b and prevents the second compressed fresh-air flow 3d from flowing back into the charging-air outlet 6b or into the cell rotor 8.

Figure 6:
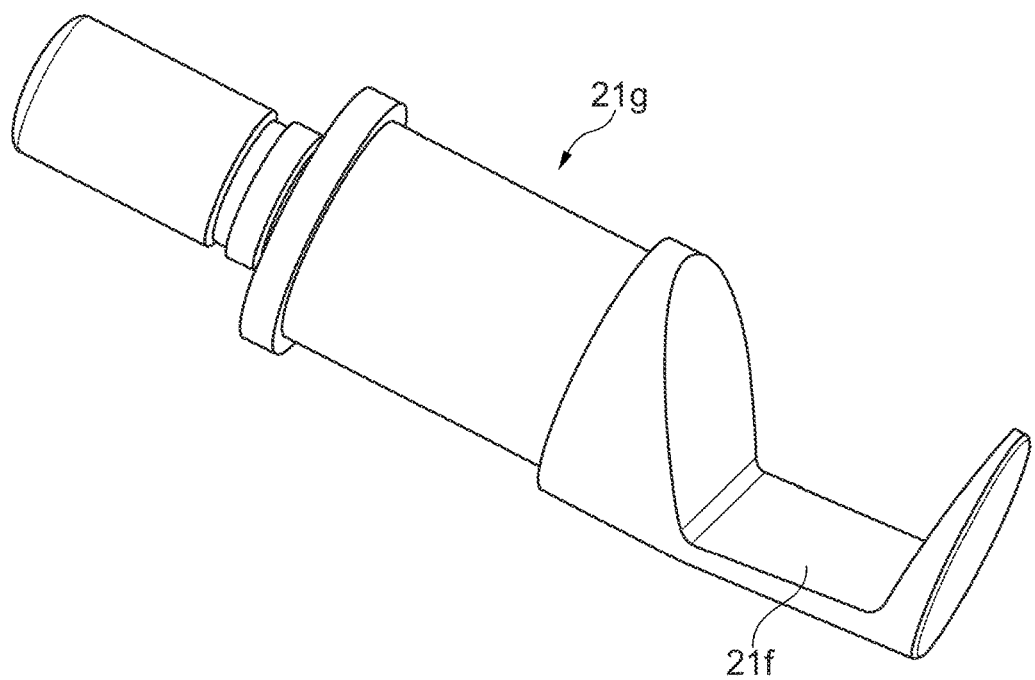
FIG. 6 shows a perspective view of a rotary part of a rotary slide.
Figure 7:
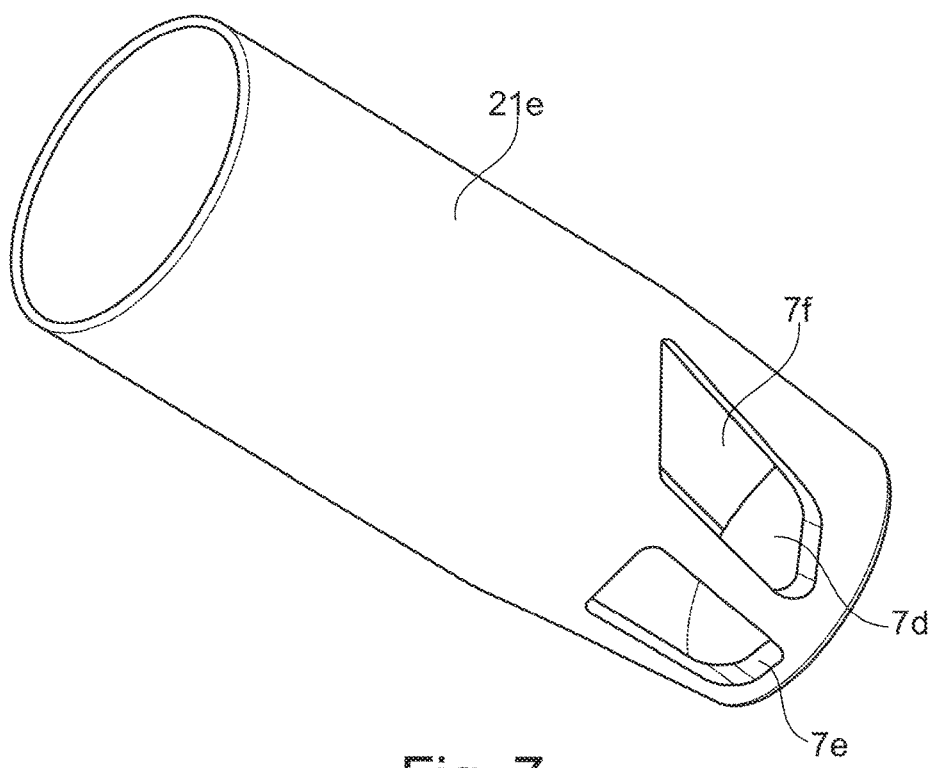
FIG. 7 shows a perspective view of an outer sleeve for the rotary slide illustrated in FIG. 6.

FIGS. 6 and 7 show an illustrative embodiment of a valve 21 comprising a steel sleeve 21e and a valve part 21g rotatably mounted therein. The sleeve 21e comprises an inlet opening 7f and outlet openings 7d, 7e. The rotatable valve part 21g comprises a rotary slide 21f, wherein the rotatable valve part 21g is mounted rotatably in the sleeve 21e in such a way that the rotary slide 21f can partially or completely cover or completely open the outlet openings 7d, 7e, depending on the position thereof.

The invention claimed is:

1. A method for adjusting a charging pressure in an internal combustion engine having a pressure-wave supercharger,
the pressure-wave supercharger has a cell rotor that passes through at least two compression cycles per revolution,
a high-pressure exhaust-gas flow is divided into a first and a second high-pressure exhaust-gas partial flow,
a fresh-air flow and the first high-pressure exhaust-gas partial flow are fed to the cell rotor and a first compressed fresh-air flow and a low-pressure exhaust-gas flow are led away from the cell rotor in the first compression cycle, and
the fresh-air flow and the second high-pressure exhaust-gas partial flow are fed to the cell rotor and a second compressed fresh-air flow and the low-pressure exhaust-gas flow are led away from the cell rotor in the second compression cycle,
the first and the second compressed fresh-air flow are combined into a charging air, and the charging air is fed to the internal combustion engine,
the method comprising controlling the second high-pressure exhaust-gas partial flow to control the charging pressure of the charging air, the second compressed fresh-air flow is led through a check valve before the first and the second compressed fresh-air flow is combined into the charging air.

2. The method as claimed in claim 1, wherein the pressure-wave supercharger is operated in a first operating state, in which the first high-pressure exhaust-gas partial flow is fed to the cell rotor during the first compression cycle and no second high-pressure exhaust-gas partial flow is fed to the cell rotor during the second compression cycle,
the pressure-wave supercharger is operated in a second operating state, in which both the first high-pressure exhaust-gas partial flow is fed to the cell rotor during the first compression cycle and the second high-pressure exhaust-gas partial flow is fed to the cell rotor during the second compression cycle, and
a switch is made between the first and the second operating state, depending on a measured operating state value and a predetermined setpoint switchover value;
wherein the operating state value is the value of the supplied quantity of charging air or of the charging air pressure or of the engine speed, and
wherein the setpoint switchover value is a predetermined reference value corresponding to the operating state value.

3. The method as claimed in claim 2, wherein the charging air fed to the internal combustion engine can have a maximum charging air pressure $P_{Max}$, and in that the setpoint switchover value is in a range of from 40% to 50% of the maximum charging air pressure $P_{Max}$.

4. The method as claimed in claim 2, wherein the first high-pressure exhaust-gas partial flow is divided into a first gas-pocket flow and a first high-pressure exhaust-gas partial flow, and the first gas-pocket flow is controlled in accordance with the required pressure of the charging air.

5. The method as claimed in claim 2, wherein the second high-pressure exhaust-gas partial flow is divided into a second gas-pocket flow and a second high-pressure exhaust-gas partial flow, and the second gas-pocket flow and/or the second high-pressure exhaust-gas partial flow is controlled in accordance with the required pressure of the charging air.

6. The method as claimed in claim 2, wherein the speed of the cell rotor is reduced when the pressure-wave supercharger is operated in the second operating state, and the speed of the cell rotor is increased when the pressure-wave supercharger is operated in the first operating state.

7. The method as claimed in claim 1, wherein the pressure-wave supercharger is operated in a first operating state, in which the first high-pressure exhaust-gas partial flow is fed to the cell rotor during the first compression cycle, and the second high-pressure exhaust-gas partial flow is reduced by a valve during the second compression cycle and, as a result, a reduced, second high-pressure exhaust-gas partial flow is supplied,
the pressure-wave supercharger is operated in a second operating state, in which both the first high-pressure exhaust-gas partial flow is fed to the cell rotor during the first compression cycle and the unreduced, second high-pressure exhaust-gas partial flow is fed to the cell rotor during the second compression cycle, and
a switch is made between the first and the second operating state, depending on a measured operating state value and a predetermined setpoint switchover value,
wherein the operating state value is the value of the supplied quantity of charging air, the charging air pressure, or the engine speed, and
wherein the setpoint switchover value is a value in a range of from 40% to 50% of a maximum charging air quantity $L_{Max}$ that can be fed to the internal combustion engine.

8. The method as claimed in claim 1, wherein the first high-pressure exhaust-gas partial flow is fed to the cell rotor in an uncontrolled manner during the first compression cycle, and the second high-pressure exhaust-gas partial flow is fed to the cell rotor in a manner controlled by a cell rotor valve during the second compression cycle.

9. A device for adjusting a charging pressure in an internal combustion engine having a pressure-wave supercharger, the pressure-wave supercharger has a cell rotor, an intake-air duct, a charging-air duct, a high-pressure exhaust-gas duct and an outlet duct, the intake-air duct, the high-pressure exhaust-gas duct and the charging-air duct are arranged such that a fresh-air flow can be fed to the cell rotor via the intake-air duct and a high-pressure exhaust-gas flow can be fed to the cell rotor via the high-pressure exhaust-gas duct, and a compressed fresh air can be discharged from the cell rotor via the charging-air duct, the pressure-wave supercharger performs at least one first and one second compression cycle during one revolution as the intake-air duct branches into a first and a second intake-air subduct, as the high-pressure exhaust-gas duct branches into a first and a second high-pressure exhaust-gas subduct, and as the charging-air duct is supplied by a first and a second charging-air subduct, the device comprises a controllable valve arranged in the second high-pressure exhaust-gas subduct to control the quantity of the high-pressure exhaust-gas flow flowing through the second high-pressure exhaust-gas subduct, a check valve is arranged in the second air-guiding duct, and an open-loop and closed-loop control device is provided, which actuates the controllable valve in accordance with a load input to control the pressure of the charging air fed to the internal combustion engine.

10. The device as claimed in claim 9 wherein the controllable valve is a rotary slide valve.

11. The device as claimed in claim 10, wherein the rotary slide valve comprises two partial valves, a first partial valve, the downstream fluid-guiding duct of which opens into a gas pocket, and a second partial valve, the downstream fluid-guiding duct of which opens into a main duct of the cell rotor.

* * * * *